(12) United States Patent
Suwald et al.

(10) Patent No.: US 10,503,957 B2
(45) Date of Patent: Dec. 10, 2019

(54) FINGERPRINT AUTHENTICATION SYSTEM AND METHOD

(71) Applicant: NXP B.V., Eindhoven (NL)

(72) Inventors: Thomas Suwald, Hamburg (DE); Arne Burghardt, Hamburg (DE)

(73) Assignee: NXP B.V., Eindhoven (NL)

( * ) Notice: Subject to any disclaimer, the term of this patent is extended or adjusted under 35 U.S.C. 154(b) by 70 days.

(21) Appl. No.: 15/487,807

(22) Filed: Apr. 14, 2017

(65) Prior Publication Data

US 2017/0300739 A1 Oct. 19, 2017

(30) Foreign Application Priority Data

Apr. 15, 2016 (EP) .................................. 16165516

(51) Int. Cl.
*G06K 9/00* (2006.01)

(52) U.S. Cl.
CPC ..... *G06K 9/00093* (2013.01); *G06K 9/00073* (2013.01)

(58) Field of Classification Search
CPC ........... G06K 9/00093; G06K 9/00073; G06K 9/00087; G06K 2009/00959
See application file for complete search history.

(56) References Cited

U.S. PATENT DOCUMENTS

| | | | | |
|---|---|---|---|---|
| 5,631,971 A * | 5/1997 | Sparrow | ............ | G06K 9/00067 382/125 |
| 5,960,101 A * | 9/1999 | Lo | ....... | G06K 9/00087 382/124 |
| 6,655,585 B2 * | 12/2003 | Shinn | ....... | G06K 9/00 235/382 |
| 6,681,034 B1 * | 1/2004 | Russo | ............ | G06K 9/00087 382/125 |
| 6,778,685 B1 * | 8/2004 | Jiang | ........ | G06K 9/00087 382/115 |
| 8,005,277 B2 | 8/2011 | Tulyakov et al. | | |

(Continued)

FOREIGN PATENT DOCUMENTS

| | | |
|---|---|---|
| EP | 3 109 793 A1 | 12/2016 |
| EP | 3 244 342 A1 | 11/2017 |
| WO | WO 2007/036825 A1 | 4/2007 |

OTHER PUBLICATIONS

Yahaya,Yuhanim et al., "Fingerprint Biometrics on Smart Card", Second International Conference on Computer and Electrical Engineering, IEEE, 2009, pp. 671-673.*

(Continued)

*Primary Examiner* — Samir A Ahmed (57) ABSTRACT

According to a first aspect of the present disclosure, a fingerprint authentication system is provided, comprising: a transformation unit configured to transform a first format of a captured fingerprint into a second format of the captured fingerprint, wherein the first format defines coordinates of minutia positions and the second format defines relative positions of minutiae; and an authentication unit configured to compare the relative positions with stored reference values. According to a second aspect of the present disclosure, a corresponding fingerprint authentication method is conceived. According to a third aspect of the present disclosure, a corresponding computer program product is provided.

19 Claims, 5 Drawing Sheets

(56) References Cited

U.S. PATENT DOCUMENTS

| | | | | |
|---|---|---|---|---|
| 9,471,765 | B1* | 10/2016 | Setterberg | G06K 9/00026 |
| 2004/0129787 | A1* | 7/2004 | Saito | G06K 19/07 235/492 |
| 2005/0063562 | A1* | 3/2005 | Brunk | G06K 9/00067 382/100 |
| 2005/0139685 | A1* | 6/2005 | Kozlay | G06K 19/07354 235/492 |
| 2008/0049987 | A1* | 2/2008 | Champagne | G06K 9/00026 382/124 |
| 2008/0279416 | A1* | 11/2008 | Lo | G06K 9/00087 382/100 |
| 2008/0283615 | A1* | 11/2008 | Finn | G06K 19/077 235/488 |
| 2010/0202671 | A1* | 8/2010 | Chen | G06K 9/00093 382/125 |
| 2014/0380452 | A1* | 12/2014 | Suwald | H04L 63/0853 726/9 |
| 2015/0288523 | A1* | 10/2015 | Burghardt | G06F 21/34 726/20 |
| 2016/0232401 | A1* | 8/2016 | Hoyos | G06T 7/11 |
| 2016/0371527 | A1 | 12/2016 | Suwald | |
| 2017/0116505 | A1 | 4/2017 | Suwald | |
| 2017/0262689 | A1 | 9/2017 | Suwald | |
| 2018/0012056 | A1 | 1/2018 | Suwald | |
| 2018/0144170 | A1 | 5/2018 | Suwald | |
| 2018/0203544 | A1 | 7/2018 | Suwald | |

OTHER PUBLICATIONS

Krish, Ram et al. "Integrating Minutiae Generic Fingerprint Matchers for Forensics", IEEE International Workshop on Information Forensics and Security (WIFS), 2015, pp. 1-6.*

Anderson, S. et al. "A Single Chip Sensor & Image Processor for Fingerprint Verification", IEEE Custom Integrated Circuits Conference, 1999, pp. 12.1.1-12.1.4.*

Shigematsu, Satoshi et al. "A Single-Chip Fingerprint Sensor and Identifier" IEEE Journal of Solid-State Circuits, vol. 34, No. 12, Dec. 1999, pp. 1852-1859.*

Eric R. Fossum, "CMOS Image Sensors: Electronic Camera-On-A-Chip", IEEE Transactions on Electron Devices, vol. 44, No. 10, Oct. 1997, pp. 1689-1698.*

Bansal, R. et al. "Minutiae Extraction from Fingerprint Images—a Review", International Journal of Computer Science Issues, vol. 8, issue 5, No. 3, pp. 74-85 (Sep. 2011).

Extended European Search Report for Patent Appln. No. 16165516.2 (dated Oct. 6, 2016).

Chouta, T. et al. "A Small and High-Performance Coprocessor for Fingerprint Match-On-Card", IEEE 2012 15th Euromicro Conference on Digital System Design, pp. 915-922 (Sep. 2012).

Govan, M. et al. "An Efficient Algorithm for the Implementation of Fingerprint Authentication on Smartcards", Proceedings of the Fourth Iasted International Conference Communication, Network, and Information Security, pp. 58-63 (Sep. 2007).

Reisman, J. et al. "Secure Fingerprint Matching with External Registration", Springer-Verlag, Audio and Video-Based Biometric Person Authentication, pp. 720-729 (Jun. 28, 2005).

"Biometric—Biometric Data Interchange Formats—Part 2: Finger Minutiae Data", ISO/IEC 2003, 45 pgs (Oct. 3, 2003).

Moon, Y. S. et al. "Collaborative Fingerprint Authentication by Smart Card and a Trusted Host", IEEE 2000 Canadian Conference on Electrical and Computer Engineering, pp. 108-112 (Jan. 2000).

* cited by examiner

FINGERPRINT AUTHENTICATION SYSTEM AND METHOD

CROSS-REFERENCE TO RELATED APPLICATIONS

This application claims the priority under 35 U.S.C. § 119 of European patent application no. 16165516.2, filed on Apr. 15, 2016, the contents of which are incorporated by reference herein.

FIELD

The present disclosure relates to a fingerprint authentication system. Furthermore, the present disclosure relates to a corresponding fingerprint authentication method and to a corresponding computer program product.

BACKGROUND

Today, many electronic devices and systems require a form of user authentication. For example, in a payment system, a smart card may be used to initiate a payment and to authenticate a user. In addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example. The captured fingerprint may be verified against a reference fingerprint image by the smart card itself, for example by a secure element integrated in said smart card. However, a verification of this kind may require a significant amount of computational resources. The same is true when a fingerprint is captured and verified by another device, for example a mobile phone, a tablet or a terminal. In that case, the verification of the captured fingerprint may also be performed by an embedded secure element.

SUMMARY

According to a first aspect of the present disclosure, a fingerprint authentication system is provided, comprising: a transformation unit configured to transform a first format of a captured fingerprint into a second format of the captured fingerprint, wherein the first format defines coordinates of minutia positions and the second format defines relative positions of minutiae; and an authentication unit configured to compare the relative positions with stored reference values.

In one or more embodiments, the transformation unit is implemented in a first processor and the authentication unit is implemented in a second processor, and the first processor is less secure than the second processor.

In one or more embodiments, the second processor is a secure element.

In one or more embodiments, the second format comprises a set of records, one or more records containing data specifying at least the distance between a first minutia and a second minutia and an angle between the direction of the first minutia and a straight line between the first minutia and the second minutia.

In one or more embodiments, said records further contain data specifying a distance quality margin defined as a radius around the second minutia and an angle quality margin defined as a range for said angle.

In one or more embodiments, said records further contain data specifying spectral components between the first minutia and the second minutia and a spectral-components quality margin, and the authentication unit is further configured to compare the spectral components with the stored reference values.

In one or more embodiments, said records further contain data specifying the type of the second minutia, and the authentication unit is further configured to compare said type with the stored reference values.

In one or more embodiments, the system is configured to determine the reference values in an enrolment mode.

In one or more embodiments, the system is further configured to flag, in said enrolment mode, one or more relationships between minutiae as irrelevant.

In one or more embodiments, the reference values are securely stored in the authentication unit.

In one or more embodiments, the authentication unit is further configured to generate a matching score indicative of the extent to which the relative positions correspond to the stored reference values, and to determine that the captured fingerprint is authentic if the matching score exceeds a predefined threshold, or to maintain an error counter indicative of the extent to which the relative positions do not correspond to the stored reference values, and to determine that the captured fingerprint is not authentic if the error counter exceeds a predefined threshold.

In one or more embodiments, the transformation unit is further configured to provide a sorted list of minutiae to the authentication unit.

In one or more embodiments, a smart card comprises a system of the kind set forth.

According to a second aspect of the present disclosure, a fingerprint authentication method is conceived, comprising: a transformation unit transforms a first format of a captured fingerprint into a second format of the captured fingerprint, wherein the first format defines coordinates of minutia positions and the second format defines relative positions of minutiae; and an authentication unit compares the relative positions with stored reference values.

According to a third aspect of the present disclosure, a computer program product is provided, comprising non-transient instructions for carrying out a method of the kind set forth.

DESCRIPTION OF DRAWINGS

Embodiments will be described in more detail with reference to the appended drawings, in which.

DESCRIPTION OF EMBODIMENTS

Figure 1A:
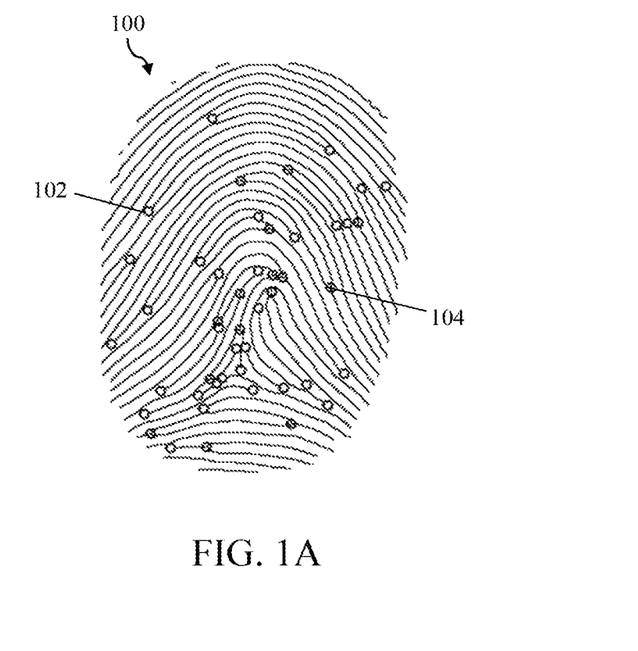
FIG. 1A shows an example of a fingerprint.

FIG. 1A shows an example of a fingerprint 100. Biometric verification is often performed by comparing (i.e., matching)

a set of features extracted from a biometric with a set of features extracted from the same biometric earlier in time (i.e., a reference value). A biometric exhibits some variation in its features that require a comparison based on a probability model. If the probability resulting from a matching operation exceeds a previously defined threshold (i.e., a detection threshold) the verification may be regarded as having a positive result.

Fingerprint authentication is a popular form of biometric verification. In case the biometric is a fingerprint, so-called minutiae are often used as features that characterize a particular fingerprint. A minutia may be defined as a point of interest in a fingerprint, such as an ending or a bifurcation of a ridge. For example, minutiae may include: a ridge ending (the abrupt end of a ridge); a ridge bifurcation (a single ridge that divides into two ridges); a short ridge, or independent ridge (a ridge that commences, travels a short distance and then ends); an island (a single small ridge inside a short ridge or ridge ending that is not connected to all other ridges); a ridge enclosure (a single ridge that bifurcates and reunites shortly afterward to continue as a single ridge); a spur (a bifurcation with a short ridge branching off a longer ridge); a crossover or bridge (a short ridge that runs between two parallel ridges); a delta (a Y-shaped ridge meeting); a core (a U-turn in the ridge pattern). Ridge endings and ridge bifurcations are the most frequently used minutiae for fingerprint authentication. The standard ISO/IEC 19794-2 specifies a concept and data formats for representation of fingerprints using the fundamental notion of minutiae. In FIG. 1A minutiae in the fingerprint 100 are encircled. For example, minutia 102 is a ridge ending, and minutia 104 is a ridge bifurcation.

Fingerprint authentication involves matching a previously stored fingerprint image (i.e., a reference template) with a fingerprint image captured at the moment of an authentication request (i.e., a live template). That is to say, in case of an authentic fingerprint, a sufficiently good match is achieved between the reference template and the captured image. This may be achieved by comparing the presence and nature of minutiae extracted from the live template with the presence and nature of minutiae in the reference template. In order to compare the presence and the properties of a minutia it is sufficient to create a set of records for every minutia, wherein each record holds the information characterizing a particular minutia. It is noted that a minutia and its properties may be referred to as a feature of the fingerprint. The format of these records is standardized in ISO/IEC 19794-2. According to this format, each minutia may for example be characterized by the type of minutia (e.g., ridge bifurcation or ridge ending), the minutia point (coordinates x and y), and the minutia direction (angle $\theta$). Each type of minutia has a predefined direction. For example, if the minutia is a ridge bifurcation, the coordinates x and y identify the location where the ridge splits to form a Y-shape, and the minutia direction (angle $\theta$) points along the gap between the two ridge branches of the Y. In other words, for a ridge bifurcation, the minutia's location is where the ridge starts to split into two, and the minutia's direction moves along the valley between the two branching ridges. This has been described in the article "Minutiae Extraction from Fingerprint Images—a Review", by Roli Bansal, Priti Sehgal and Punam Bedi, published in the IJCSI International Journal of Computer Science Issues, Vol. 8, Issue 5, No 3, September 2011.

Figure 1B:
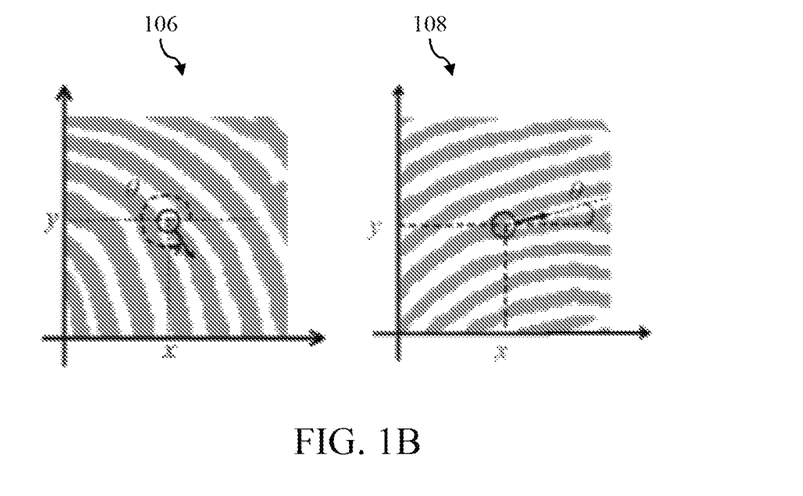
FIG. 1B shows an example of minutia directions.

FIG. 1B shows an example of minutia directions. In particular, FIG. 1B, which is included in the aforementioned article, shows on the left side the predefined direction of a ridge ending 106, and on the right side the predefined direction of a ridge bifurcation 108.

However, the information contained in the standardized records may be difficult to process by a processor having limited computational resources (e.g., limited memory space). Furthermore, it may require the execution of higher mathematical operations, such as the calculation of Euclidian distances between minutiae, and even trigonometric functions to compensate rotations or shifts of the minutiae records while comparing them with the stored minutiae templates. Therefore, it may be difficult to authenticate a fingerprint in an efficient manner. Therefore, in accordance with the present disclosure, a fingerprint authentication system is provided as described with reference to FIG. 2A, and a fingerprint authentication method is conceived as described with reference to FIG. 2B. Using the presently disclosed authentication system and method, a fingerprint may be authenticated in a relatively efficient manner.

Figure 2A:
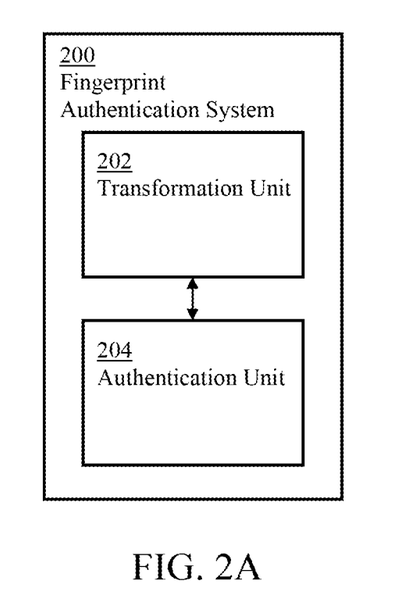
FIG. 2A shows an illustrative embodiment of a fingerprint authentication system.

FIG. 2A shows an illustrative embodiment of a fingerprint authentication system 200. The fingerprint authentication system 200 comprises a transformation unit 202 which is operatively coupled to an authentication unit 204. The transformation unit 202 is configured to transform a first format of a captured fingerprint into a second format of the captured fingerprint. More specifically, the first format defines coordinates of minutia positions and the second format defines relative positions of minutiae. The first format may for example be the above-mentioned format which is standardized in ISO/IEC 19794-2. In particular, the transformation unit 202 may compute relative minutiae positions using the coordinates of minutia positions specified in the records formatted according to the first format, and output those relative minutiae positions as values in records formatted according to the second format. Furthermore, the authentication unit 204 is configured to compare the relative positions provided by the transformation unit 202 with stored reference values. The inventors have realized that, by using relative minutiae positions for the comparison, and separating the computation of the relative minutiae positions from their use in said comparison, it becomes possible to increase the efficiency of the fingerprint authentication system. In particular, the computation of the relative minutiae positions may be performed by a high-performance processor (e.g., an application processor). This high-performance processor need not be highly secure because the computation of the relative minutiae positions does not involve sensitive data. On the other hand, the comparison of the relative minutiae positions does involve sensitive data, but it is not a computationally-intensive process, so it may be performed by a processor having lower performance, yet higher security, than the high-performance processor. Thus, in a particularly efficient embodiment, the transformation unit 202 is implemented in a first processor and the authentication unit 204 is implemented in a second processor, and the first processor is less secure than the second processor. In a practical implementation, the second processor is a secure element. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

Figure 2B:
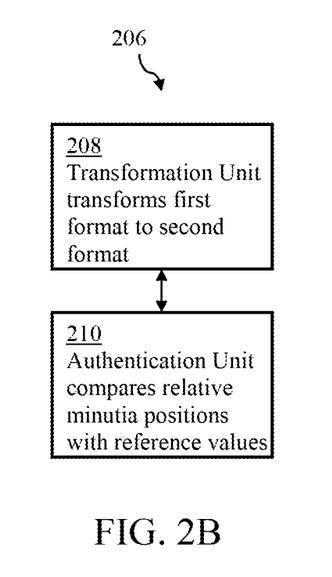
FIG. 2B shows an illustrative embodiment of a fingerprint authentication method.

FIG. 2B shows an illustrative embodiment of a fingerprint authentication method 200 corresponding to the fingerprint authentication system 100 shown in FIG. 1. In particular, at 208, the transformation unit 202 transforms a first format of a captured fingerprint into a second format of the captured fingerprint, wherein the first format defines coordinates of minutia positions and the second format defines relative positions of minutiae. Then, at 210, the authentication unit 204 compares the relative positions with stored reference values. The method may at least partly be implemented by one or more computer programs or software modules. That is to say, at least a part of the transformation unit 202 and the authentication unit 204, respectively, may conveniently be implemented in software.

Thus, in accordance with the present disclosure, the information contained in a standardized ISO-template (i.e., the first format) may be transformed into a format that may be processed in a simpler way by a processor with limited resources. For that purpose the matching of the data contained in the ISO-template is split up into a process that transforms the ISO data into a list format representing relative positions minutiae. Furthermore, the data specifying the relative positions may be supplemented by individual characteristics of said minutiae, such as the type of individual minutiae and the spectral components between pairs of minutiae, which may result in a more precise comparison. The resulting simplified template may be processed by a processor with limited storage and computational resources. If the fingerprint authentication is part of a financial transaction strict requirements may exist to perform the security-relevant part of the matching in the secure processing environment of a secure element. Thus, in one or more embodiments, the authentication unit 204 is implemented in a secure element. Furthermore, all processing steps which are not security-relevant may be separated from the security-relevant processing steps, such that the former processing steps may be performed by a non-secure processor while only the security-relevant processing steps may be performed by the secure element. Thus, in one or more embodiments, the transformation unit 202 is implemented in a non-secure or less secure processor having a higher computational performance than the secure element. This may enable offloading the secure element from all higher mathematical operations and increasing the performance of the authentication system.

Figure 3:
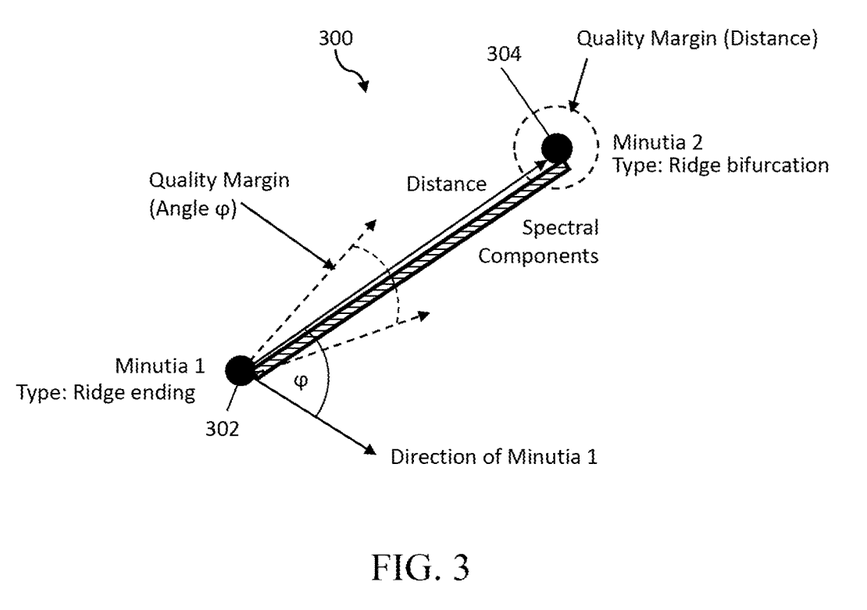
FIG. 3 shows an illustrative embodiment of relative minutia data.

FIG. 3 shows an illustrative embodiment of relative minutia data 300. The embodiment shown in FIG. 3 is a simplified example in which the position of a second minutia 304 relative to a first minutia 302 is shown. In this example, the position of the second minutia 304 relative to the first minutia 302 is defined in terms of the distance between the first minutia 302 and the second minutia 304 and the angle φ between the direction of the first minutia 302 and a straight line, referred to as the "line of sight", between the first minutia 302 and the second minutia 304. That is to say, the transformation unit 202 may determine the line of sight between the first minutia 302 and the second minutia 304 using their coordinates and express the relative position of the second minutia 304 using as parameters the length of said line of sight (distance) and the angle φ between the direction of the first minutia 302 (as defined by the angle θ) and said line of sight. Furthermore, the type of the second minutia 304 may be a relevant characteristic of the second minutia 304, and may thus be used as a parameter of the relative minutia data 300; thereby, a more precise fingerprint authentication may be achieved. Furthermore, a distance quality margin defined as a radius around the second minutia 304 may be useful, in order to define a margin for the distance within which a positive match may be detected. Thereby, a certain degree of variation may be taken into account. Also the angle φ may be subject to a certain degree of variation, and thus an angle quality margin may express the variation of the angle φ. Furthermore, one or more spectral components may be present in the line of sight between the first minutia 302 and the second minutia 304. Examples of spectral components are ridges and valleys between the first minutia 302 and the second minutia 304. These ridges and valleys may be close together (i.e., have a high frequency) or not (i.e., have a low frequency) and they may have an average direction. The spectral components may thus be defined by their frequency and angle. These spectral components may also be used as a parameter of the relative minutia data 300, i.e. they may be defined by record data of the second format. Again, a quality margin may be defined for these spectral components, defining a margin within which a positive match may be detected.

For n minutiae n*(n−1) records may be required to fully describe the relative positions of all minutiae. Hence, the biometric characteristics of a fingerprint may be fully described by said set of records. The calculation of the relative record data is not security-relevant and may hence be executed by a non-secure application processor. The data represented by the set of minutiae records is also not security-relevant as it represents just a different representation of the captured fingerprint (i.e., the live fingerprint). Only the matching process is security-relevant and can therefore be executed in the secure environment of a secure element. The set of records representing the minutiae information as well as the spectral information may be communicated to the secure element for verification (i.e., for comparison with stored reference values).

Figure 4:
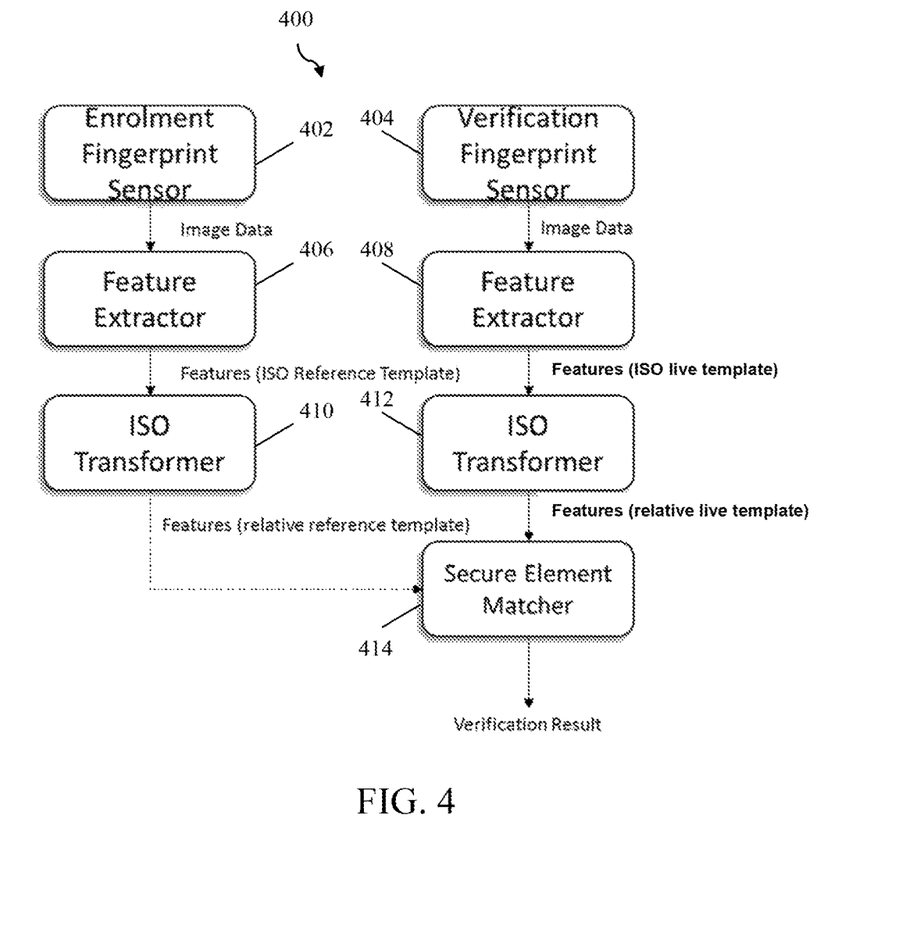
FIG. 4 shows another illustrative embodiment of a fingerprint authentication system.

FIG. 4 shows another illustrative embodiment of a fingerprint authentication system 400. The system 400 comprises a first portion which in turn comprises an enrolment fingerprint sensor 402, a feature extractor 406, and an ISO transformer 410. Furthermore, the system 400 comprises a second portion which in turn comprises a verification fingerprint sensor 404, a feature extractor 408, an ISO transformer 412, and a secure element matcher 414. The enrolment fingerprint sensor 402, feature extractor 406, and ISO transformer 410 are used for generating the reference values, referred to as a relative reference template in FIG. 4. The verification fingerprint sensor 404, feature extractor 408, ISO transformer 412, and secure element matcher 414 are used for verifying features of a captured fingerprint against the reference values. In both portions, a transformation unit (ISO transformers 410, 412) transforms the standardized format of the captured fingerprint (defining coordinates of minutia positions) into a format defining relative positions of the minutiae. The authentication unit (secure element matcher 414) compares these relative positions with the reference values. The matcher 414 may form part of a secure element that also contains a storage unit; accordingly, the reference values, which constitute sensitive information, may be stored securely in the secure element. Thereby, a high level of security may be achieved.

It is noted that the first portion and second portion of the system 400 may be implemented in different end-user devices, i.e. a first device for creating the reference values (e.g., a terminal in a bank or town hall) and a second device for authenticating fingerprints using the reference values provided by the first device (e.g., a smart card issued by said bank or by a local government). In that case, the sensors 402, 404, feature extractors 406, 408, and ISO transformers 410, 412 are not the same devices, but they are functionally identical. Alternatively, the first portion and the second portion of the system 400 may be implemented in a single end-user device, for example a smart card. In that case, the portions may overlap each other in the sense that a single sensor may be used as enrolment fingerprint sensor 402 and verification fingerprint sensor 404, depending on a mode or state of the end-user device. Likewise, a single feature extractor may be used as feature extractor 406 or feature extractor 408, and a single transformer may be used as ISO transformer 410 or ISO transformer 412, depending on said mode or state. Thus, in a practical and efficient implementation, the system 400 is configured to determine the reference values in an enrolment mode. More specifically, the system 400 may capture a fingerprint image (by using its fingerprint sensor as an enrolment fingerprint sensor 402), extract features (i.e., minutiae) from the captured fingerprint image (by using its feature extractor as feature extractor 406, which outputs minutiae data comprising minutia coordinates), and generate reference values by transforming the "absolute" minutia data into relative minutia data (by using its ISO transformer as ISO transformer 410). In a verification or authentication mode, the system 400 may use the same components for authenticating a captured fingerprint.

Figure 5:
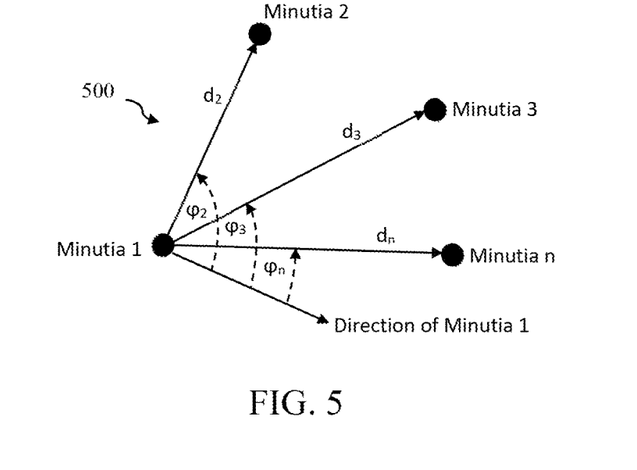
FIG. 5 shows an illustrative embodiment of minutiae relationships.

FIG. 5 shows an illustrative embodiment of relative minutia positions 500. In particular, the relative positions of minutiae in a fingerprint comprising a plurality of minutiae may be described using the aforementioned second format. For the purpose of matching, a secure element may now perform a one-to-one comparison of all relative positions defined in the relative reference template and all relative positions defined in the relative live template. This comparison may use the quality margins described with reference to FIG. 3. As an example, the following comparisons may be made between a first minutia and second minutia comprised in said plurality of minutiae:

- Is the deviation between the distance between the first minutia and the second minutia in the relative reference template and the distance between the first minutia and second minutia in the relative live template within the radius as defined by the distance quality margin? Thus, for example, is $abs(d_2^{reference} - d_2^{live}) < distance\_quality\_margin$? If so, then it may be concluded that there is a positive match between the distance parameters in the relative reference template and the relative live template.
- Is the difference between the angle φ for the second minutia in the relative reference template and same angle φ in the relative live template within the range defined by the angle quality margin? Thus, for example, is $abs(\varphi_2^{reference} - \varphi_2^{live}) < angle\_quality\_margin$? If so, then it may be concluded that there is a positive match between the angle parameters in the relative reference template and the relative live template.
- Is the type of minutia 2 the same as the type stored in the reference template? If so, then it may be concluded that there is a positive match between the type parameters in the relative reference template and the relative live template.
- Are the spectral components identified along the line of sight between the first minutia and the second minutia in the relative reference template the same, within a given quality margin, as the spectral components obtained from the live template? If so, then it may be concluded that there is a positive match between the spectral-components parameters in the relative reference template and the relative live template.

In one or more embodiments, the authentication unit 204 may generate a matching score indicative of the extent to which the relationships between the minutiae correspond to the stored reference values. Accordingly, a high matching score value may be generated if a parameter is within the expected range and a lower value may be generated when the parameter is outside the expected range. Furthermore, a weighing function may consider how far the parameter is outside the expected range. A total matching score may be obtained by combining the results of the individual matching results into a total matching result. A threshold value may be defined such that if the total matching result based on a live fingerprint is above the threshold, the live fingerprint may be regarded as authentic.

Alternatively, the matching process may make use of an error counter. In particular, if a parameter is within an expected range, the error counter will not be increased. However, it the parameter is outside the expected range, the error counter is increased, for example using the formula (outer expected limit−current value)². Due to the square function the error becomes bigger the farther the current value is away from the outer expected limit. This error calculation may be done for all parameters (e.g., distance, angle, type, spectral components). If the error counter exceeds a predefined threshold, the matching process may stop and it may be concluded that the presented fingerprint is not authentic.

The relative templates may make use of triangular relationships between minutiae, where a triangle may clearly be defined by three sides rather than one side and two angles. A definition by three sides eliminates the need for a calculation by means of trigonometric functions. Furthermore, it may make the templates fully relative and thus independent of rotation and thus no compensation for rotations between the relative reference template and the relative live template may be required. Consequently, the computational requirements for the matching processor may be minimized. In some embodiments, the relevance of relationships between the minutiae is evaluated during enrolment. An example of a relationship is the position of one minutia relative to another minutia, as expressed by the distance between them and the angle φ. If the relevance of a relationship is below a predefined threshold, it may be flagged as irrelevant for matching. Consequently, this relationship may be ignored when the authentication system operates in the verification or authentication mode. The purpose of flagging a relationship as irrelevant may be to reduce the number of relationships for matching, which may result in overall matching speed gain, which in turn may result in a lower integral power consumption of the system. Furthermore, in some embodiments the matching time may be shortened, if the transformation unit 202 presents a sorted list of minutiae to the authentication unit 204; for example, the less frequent minutiae type may be ranked first in the list.

Figure 6:
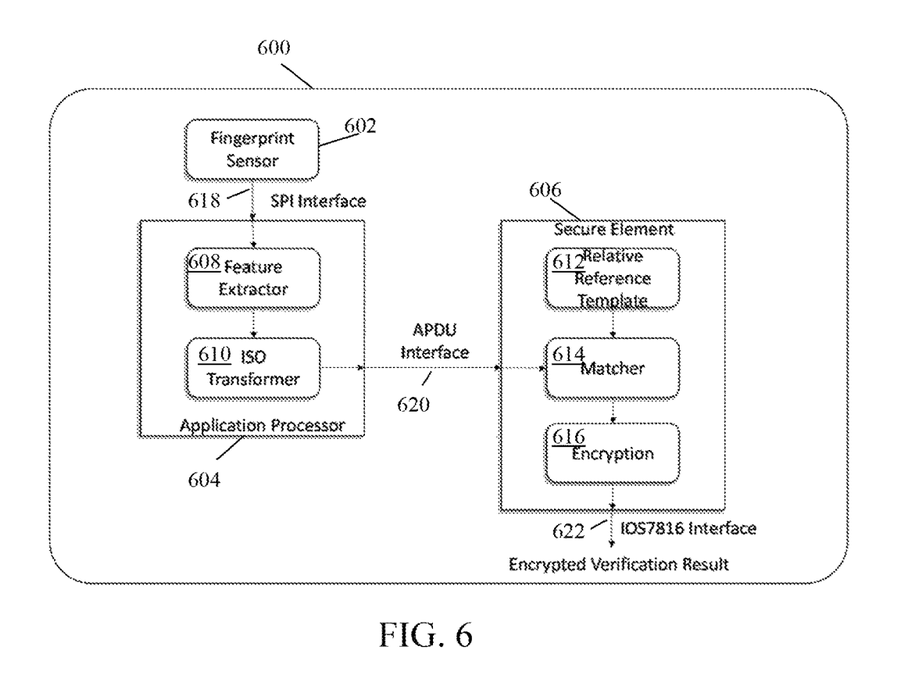
FIG. 6 shows an illustrative embodiment of a smart card.

FIG. 6 shows an illustrative embodiment of a smart card 600. The smart card 600 may for example be used to perform fingerprint authentication towards a financial transaction process or an e-Gov (electronic government) application. It is noted that the use of the presently disclosed system and method is not limited to smart cards. That is to say, the smart card 600 should be regarded merely as an example, and the presently disclosed system and method may also be useful for other types of end-user devices, such as mobile phones, tablets or terminals. In this example, the smart card 600 comprises a fingerprint sensor 602 which is operatively coupled to an application processor 604. Furthermore, the smart card 600 comprises a secure element 606 which is operatively coupled to the application processor 604. The application processor 604 may be high-performance processor, while the secure element 606 may be a processor having lower performance but higher security. The application processor 604 may perform process steps which are not security-relevant, such as the extraction of minutiae (features) by a feature extractor 608 from a fingerprint image captured by the fingerprint sensor 602 and the transformation to a format defining relative positions of the minutiae by an ISO transformer 610 of the kind set forth. The fingerprint sensor 602 may provide the fingerprint image to the feature extractor 608 through a Serial Peripheral Interface (SPI) interface 618. The ISO transformer 610 may forward the data defining the relative positions to a matcher 614 of the secure element 606 through an Application Protocol Data Unit (APDU) interface 620. The matcher 614 may compare the relative positions formatted as a relative live template with reference values stored as a relative reference template 612 in the secure element 606. The matcher 614 may compare the relative positions with the reference values and generate a matching score in dependence on the result of this comparison, and if the matching score exceeds a predefined threshold, the matcher 614 may output a positive verification result. The verification result may be encrypted using an encryption function 616 implemented in the secure element. Subsequently, the encrypted verification result may be transmitted to, for instance, a terminal device through a contact interface, such as an ISO-7816 interface.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 fingerprint
102 ridge ending
104 ridge bifurcation
106 predefined direction of a ridge ending
108 predefined direction of a ridge bifurcation 200 fingerprint authentication system
202 transformation unit
204 authentication unit
206 fingerprint authentication method
208 transformation unit transforms first format to second format
210 authentication unit compares relative minutiae positions with reference values
300 relative minutia data
302 first minutia
304 second minutia
400 fingerprint authentication system
402 enrolment fingerprint sensor
404 verification fingerprint sensor
406 feature extractor
408 feature extractor
410 ISO transformer
412 ISO transformer
414 secure element matcher
500 minutiae relationships
600 smart card
602 fingerprint sensor
604 application processor
606 secure element
608 feature extractor
610 ISO transformer
612 relative reference template
614 matcher
616 encryption
618 SPI interface
620 APDU interface
622 ISO-7816 interface

The invention claimed is:

1. A smart card comprising:
 a fingerprint sensor configured to capture a fingerprint;
 an application processor that includes a transformation unit configured to transform a first format of the captured fingerprint into a second format of the captured fingerprint, wherein the first format defines coordinates of minutia positions and the second format defines relative positions of minutiae;
 a secure element that includes an authentication unit configured to receive data of the captured fingerprint in the second format from the application processor and to compare the relative positions with reference values that are stored in the secure element;
 wherein the authentication unit is further configured to maintain an error counter indicative of the extent to which the relative positions do not correspond to the stored reference values, and to determine that captured fingerprint is not authentic if the error counter exceeds a predefined threshold.

2. The smart card of claim 1,
 wherein the second format comprises a set of records, one or more records containing data specifying at least the distance between a first minutia and a second minutia and an angle between the direction of the first minutia and a straight line between the first minutia and the second minutia.

3. The smart card of claim 2, wherein said records further contain data specifying a distance quality margin defined as a radius around the second minutia and an angle quality margin defined as a range for said angle.

4. The smart card of claim 2, wherein said records further contain data specifying spectral components between the first minutia and the second minutia and a spectral-components quality margin, and wherein the authentication unit is further configured to compare the spectral components with the stored reference values, wherein the stored reference values include spectral component data.

5. The smart card of claim 2, wherein said records further contain data specifying the type of the second minutia, and wherein the authentication unit is further configured to compare said type with the stored reference values, wherein the stored reference values include type data.

6. The smart card of claim 1, being configured to determine the reference values in an enrolment mode.

7. The smart card of claim 6, wherein the smart card is further configured to flag, in said enrolment mode, one or more relationships between minutiae as irrelevant.

8. The smart card of claim 1, wherein the reference values are securely stored in the authentication unit.

9. The smart card of claim 1, wherein the authentication unit is further configured:
 to generate a matching score indicative of the extent to which the relative positions correspond to the stored reference values, and to determine that the captured fingerprint is authentic if the matching score exceeds a predefined threshold.

10. The smart card of claim 1, wherein the transformation unit is further configured to provide a sorted list of minutiae to the authentication unit, wherein a less frequent minutiae type is ranked first in the sorted list.

11. A method for authenticating a fingerprint on a smart card, the method comprising:
 at a fingerprint sensor of the smart care, capturing a fingerprint;
 at an application processor of the smart card, a transformation unit transforms a first format of the captured fingerprint into a second format of the captured fingerprint, wherein the first format defines coordinates of minutia positions and the second format defines relative positions of minutiae;
 at a secure element of the smart card, an authentication unit receives data of the captured fingerprint in the second format from the application processor and compares the relative positions with reference values that are stored in the secure element;
 wherein the authentication unit is further configured to maintain an error counter indicative of the extent to which the relative positions do not correspond to the stored reference values, and to determine that captured fingerprint is not authentic if the error counter exceeds a predefined threshold.

12. A computer program product comprising executable instructions stored on non-transitory medium which, when executed, carry out the method of claim 11.

13. The smart card of claim 1, wherein the secure element is an embedded chip.

14. The smart card of claim 1, wherein the secure element is a tamper-resistant and embedded chip with an installed or pre-installed smart-card-grade application.

15. The smart card of claim 1, wherein the secure element is a tamper-resistant and embedded chip with an installed or pre-installed smart-card-grade application, and wherein the secure element is configured to implement a security function.

16. The smart card of claim 1, wherein the secure element is a tamper-resistant and embedded chip with an installed or pre-installed smart-card-grade application, and wherein the secure element is configured to implement at least one of a cryptographic function and an authentication function.

17. The method of claim 11, wherein the transformation unit provides a sorted list of minutiae to the authentication unit, wherein a less frequent minutiae type is ranked first in the sorted list.

18. The smart card of claim 1, wherein if a parameter is within an expected range, the error counter is not increased, and if the parameter is outside the expected range, the error counter is increased, wherein the parameter is at least one of distance, angle, type, and spectral component.

19. The smart card of claim 18, wherein the error counter is increased by a square function.

\* \* \* \* \*